May 3, 1955  L. J. SISLEY ET AL  2,707,523
POWER STEERING MECHANISM FOR MOTOR VEHICLES
Filed June 11, 1951

Inventors
LESLIE J. SISLEY
PAUL H. CAMP
By Cook & Robinson
Attorney

United States Patent Office 2,707,523
Patented May 3, 1955

2,707,523

POWER STEERING MECHANISM FOR MOTOR VEHICLES

Leslie J. Sisley and Paul H. Camp, Seattle, Wash.; said Sisley assignor to said Camp Application June 11, 1951, Serial No. 230,902

1 Claim. (Cl. 180—79.2)

This invention relates to a power steering mechanism that is designed especially for use with engine propelled vehicles of the truck, trolley coach and automobile types which, at the present time, are manually steered.

More particularly, the present invention resides in the provision of an improved form of servo-motor for the power steering of automobiles and the like. Furthermore, a servo-motor that is associated with and controlled through the mediacy of the normally employed vehicle steering mechanism, and may be powered indirectly by the vehicle engine or directly by other suitable means.

It is the principal object of this invention to provide a mechanically powered steering mechanism for motor vehicles of the automobile types that is relatively simple in its construction; that can be easily and readily installed in vehicles that are already in use and when installed will not cause interference with manual steering of the vehicle in the usual way if such becomes necessary; that is controlled through the vehicle steering mechanism in the usual way of steering; that is relatively inexpensive, easy to make and to apply, and is effective, efficient and safe in its use.

A further object of the invention is to provide a hydraulically powered servo-motor including a novel form of "follow-up" valve device for controlling the application of the hydraulic medium thereto to control the movement of the steering wheels for steering purposes.

Further objects of the invention reside in the details of construction of parts embodied in the servo-motor and control valve, in their functional relationship and in the mode of use of the device, as will hereinafter be fully described.

In accomplishing the above mentioned and other objects of the invention, I have provided the improved details of construction, the preferred forms of which are illustrated in the accompanying drawings, wherein—

The present invention is so designed that it can be applied to the usual type of automotive vehicle without necessitating change in the arrangement of parts as already provided for the steering of the vehicle. Furthermore, it is the intent that the connections be so made between vehicle and servo-motor that should the servo-motor for any reason become inoperative, steering of the vehicle in the usual way can be carried on without difficulty.

The present illustrations are that of a typical application of the present servo-motor; it being anticipated that to adapt it for use with vehicles of different kind, model or types, changes in details of some of its parts may be necessary with no change in principle or mode of operation of the servo-motor.

Referring more in detail to the drawings—

Figure 1:
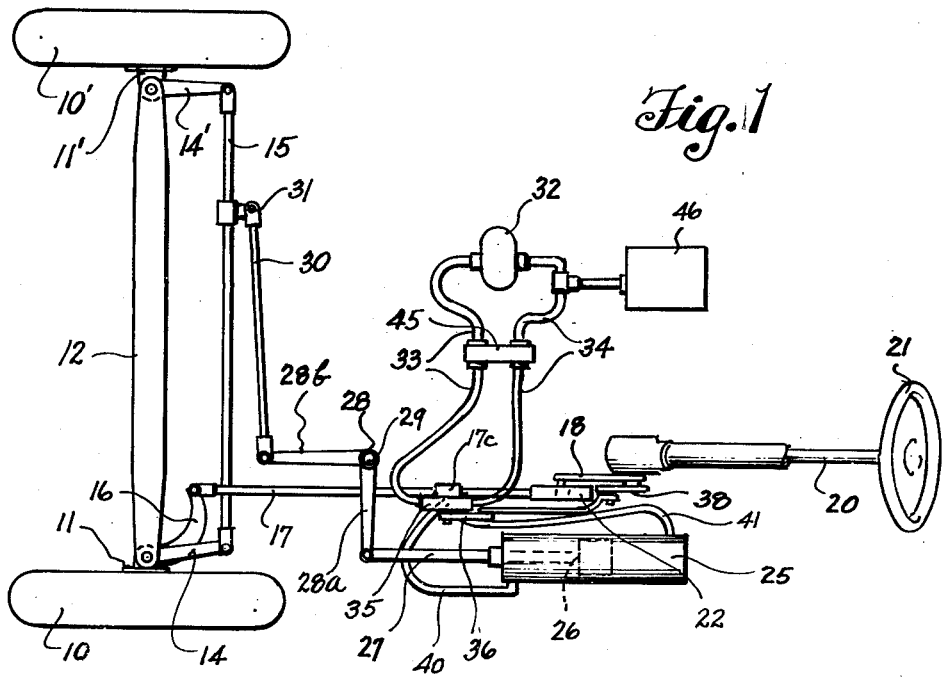
Fig. 1 is a diagrammatic plan view of a portion of a motor vehicle, showing the mode of application of the present power mechanism or servo-motor and its connection with the steering gear of the vehicle.

In Fig. 1, I have somewhat diagrammatically illustrated the front wheel assembly and the steering system of a motor driven vehicle that is typical of that of the common types of automotive vehicles for which the present power steering mechanism is designed for use. In this view, 10—10' designates the front or steering wheels of the vehicle and 11—11' designates the steering knuckles that are pivotally mounted at opposite ends of the vehicles front axle 12, and by which the wheels 10—10' are mounted for steering. The knuckles are equipped, respectively, with the usual steering arms 14—14' and, these are connected by a tie rod or cross-rod 15. The knuckle 11 is equipped with an arm 16 to which the forward end of a drag link 17 is pivotally connected in the usual way. The drag link extends rearwardly and at its rear end is pivotally connected to a crank arm 18 that is associated with the usual steering column system, including worm, and worm wheel, designated generally at 19, and operated through the steering column 20. At its upper end, the column 20 is equipped with the usual hand wheel 21 for manual steering control. These parts represent the typical and conventional means for present day hand steering of a motor vehicle.

Figure 2:
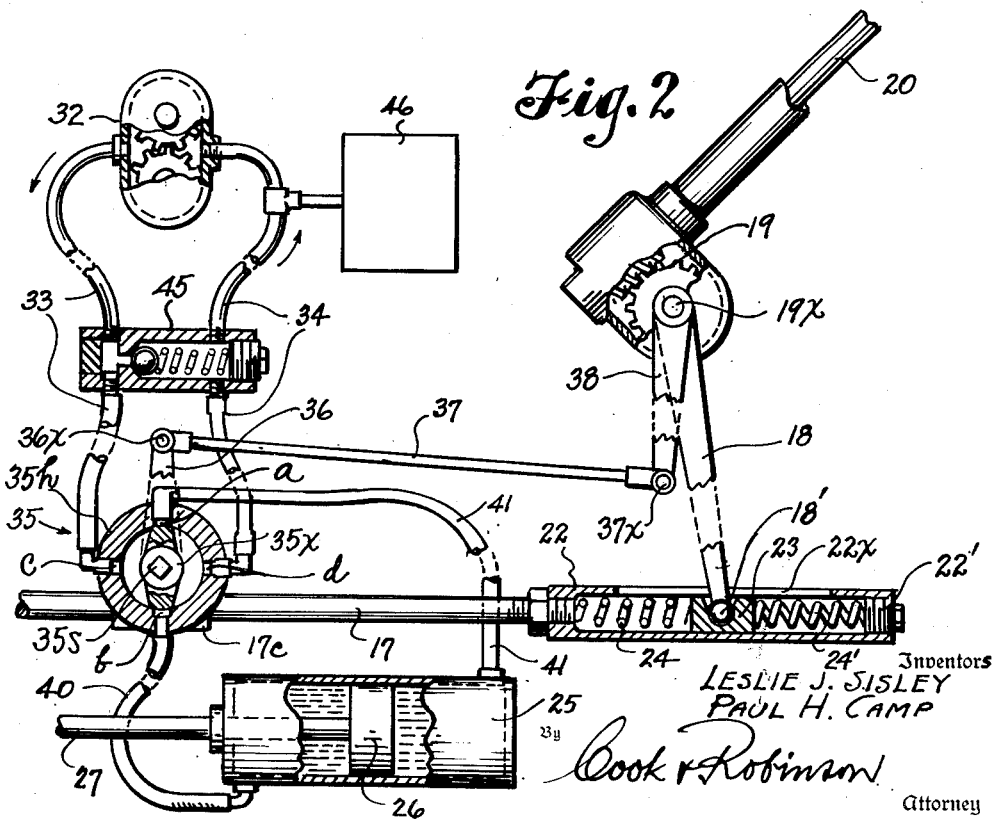
Fig. 2 is an elevation of parts of the servo-motor and control mechanism, some being shown in section for better understanding of details of construction.

One of the significant features of construction in so far as operation of the present mechanism is concerned, resides in the fact that the drag link 17 is operatively connected at its rear end to the lever arm 18 of the steering gear mechanism 19 in the manner best shown in Fig. 2, wherein it is observed that the link is threaded at its rear end into one end of a tubular extension 22 that is closed at its other end by a plug 22'. Slidably contained in the tubular member 22 is a bearing block 23 in which the ball shaped end 18' of the crank arm 18 is pivotally contained. Contained in the tubular member 22, at opposite sides of the bearing 23 are coiled springs 24—24', and these are normally under such compression as to center the bearing medially of the ends of the member 22. To accommodate the arm 18, the tube 22 is longitudinally slotted as at 22x.

When the lever arm 18 is swung forwardly or rearwardly by the action of the steering wheel, as required for turning the vehicle to one side or the other, the spring 24 or 24' toward which the lever arm swings will be somewhat compressed before the drag link can respond to the movement, and the spring will remain compressed to some extent so long as turning force is applied to the lever arm 18 through the steering column. The compressing of these springs results in a change in relationship of parts that controls the steering action as presently explained.

For the present power steering operation, I employ a servo-motor comprising a hydraulic cylinder 25 which, in use, is rigidly secured to the vehicle frame or to other rigid parts of the vehicle, to extend longitudinally of the vehicle. Contained in the cylinder 25 is a piston 26 equipped with a piston rod 27 extended forwardly from the cylinder and operatively connected at its forward end to the arm 28a of a bell crank 28 that is mounted on the frame by a pivot 29. The other arm of the bell crank, 28b, is pivotally connected to one end of a transversely directed link 30 which, in turn, is pivotally connected at its other end to the cross rod 15 as shown at 31 in Fig. 1. Thus, through the connections shown, the movement of the piston 26 from a medial location in the cylinder as seen in Fig. 2, toward its opposite ends, causes the turning of the vehicle steering wheels 10—10' to one side or the other accordingly.

The present servo-motor mechanism is characterized by the specific means used therewith in conjunction with the vehicle steering gear for effecting and controlling the application of hydraulic medium under pressure to the cylinder to effect the movements of the piston. This will now be described.

The movement of the piston 26 in the hydraulic cylinder 25 is effected by the pumping of a hydraulic medium, preferably oil, from the cylinder at one side of the piston and forcing it into the cylinder at the other side of the piston. The pumping of the medium is preferably effected by use of a gear pump 32, operated by any suitable driving connection with the vehicle engine. However, this may be accomplished by other types of pump or by any other form of motor.

The application of the pressure medium to the hydraulic cylinder to effect piston movement is effected through a control valve mechanism which is designated generally by numeral 35.

The control valve 35 comprises a housing 35h that is rigidly fixed to the drag link 17 by any suitable means, such as the clamp or clip designated at 17c. Rotatably contained in this housing is a valve plug 35x that has a squared stem 35s to which a control lever arm 36 is fixed as seen in Fig. 2. The arm 36 is pivotally connected at its outer end, as at 36x, to a link 37, and the link in turn is pivotally connected at 37x to a lever arm 38 that is fixed to the mounting shaft 19x provided for the crank arm 18. Thus, the arms 19 and 38 will swing in unison with the turning of shaft 19x as provided for by hand wheel 21. The valve housing 35h has four openings a, b, c and d. The openings a and b are diametrically opposite and have pipe connections 40 and 41 leading therefrom to opposite ends of the cylinder 25. The pipe line 33, previously mentioned leads from the discharge side of the pump 32 to opening c. Pipe 34 leads from the opening d, which is opposite opening c, to the intake side of the pump. A pressure relief valve 45 of well known kind, interconnects the pipe lines 33 and 34 and an expansion tank 46 is connected with the pipe line 34 as shown in Fig. 1.

When the pump 32 is in operation, the pressure medium as applied to one side of the valve 35 through pipe line 33 is maintained under a constant pressure.

When the arm 18 is swung forwardly or rearwardly as in steering, it will effect a certain turning movement of the valve plug 35x in its housing 35h due to the compressing of the spring 24 or 24', that is incident to the initial movement of the arm 38 in such steering action. If the vehicle is to be turned to the right, the valve plug will be rotated in the housing in one direction. If the lever arm 18 is actuated to turn the vehicle to the left, the plug will be turned in the other direction. In either instance it opens the valve for admittance of pressure medium from the pump through line 33 to the servo-motor as presently described.

When the vehicle wheels are set for straight ahead steering the valve plug 35x will be set in its neutral position, that being the position in which it is shown in Fig. 2 and the outlets a and b will be closed or covered. Also, the flow of pressure medium between opposite ends of the cylinder through the valve will be closed off. Thus, the piston 26 cannot move in the cylinder and the vehicle steering wheels will be held in straight ahead position.

If it is desired to make a turn, the steering wheel is turned by the operator in the usual way according to direction desired, thus causing the valve plug 35x to be rotatably advanced by action of lever arm 38, acting through link 37 and arm 36 to crack the valve for delivery of pressure medium by the pump through the valve to one end of the cylinder 25 and permit outflow of liquid to the system from the other end of the cylinder. This causes movement of the piston in the cylinder accordingly and effects the turning of the steering wheels 10—10' to one side or the other depending on the direction of turning of the valve plug. As the drag link 17 moves with the turning of the wheels, it shifts in direction of movement of link 37, and moves the valve mechanism 35, which is attached thereto, accordingly. This will automatically restore the valve housing and plug to the normal position if the steering wheel is not then being turned. However, so long as the operator continues to rotate the hand steering wheel, the open position of the valve can be maintained and the piston 26 will continue to be advanced in the cylinder to turn the steering wheels accordingly. The stopping of turning of the hand steering wheel at any position will stop the advancement of the piston in the cylinder and establish the steering position of the vehicle wheels 10—10'.

The operativeness of the present follow up valve mechanism is based on the fact that when the steering wheels are set in any position, the valve is closed against any flow of hydraulic medium between opposite ends of the cylinder. Thus the drag link 17 is held against movement and when the lever arms 38 and 18 are actuated, the link 17 cannot move until after the valve has been opened. The movement of the steering wheels is powered by the hydraulic medium in cylinder 25, and the steering gear lever arm 18 becomes the valve control element. The valve plug is rotatably movable in its housing only by reason of the particular connection provided between arm 18 and link 17.

The mounting of the control valve 35 need not be confined to drag link 17. This had been used because it affords a very convenient place in the present day types of automobiles. It can likewise be mounted on any part of the steering gear that has movement imparted thereto in accordance with the turning of the steering wheels as in a steering operation. For example, the valve 35 might be mounted on the cross-rod 15. This, however, would require that the valve plug be operatively connected in some way with the steering wheel. It can further be explained that in the present servo-motor control, the start of a turn from any set position of the steering wheels is instigated by the turning of the valve plug to open the passages a and b; this being effected by the turning of the steering wheel. Immediately upon opening the valve passages a and b, the turning of the steering wheels begins, and it continues until the follow up movement of the valve housing restores the valve parts to a closed relationship.

Having thus described our invention, what we claim is new therein and desire to secure by Letters Patent, is:

In a vehicle of the character described having steerable ground wheels and a manually operable steering column, a shaft geared to the steering column for actuation thereby, a drag link connected with said ground wheels, a lever arm fixed on said shaft and having an actuating connection at its end with the drag link that is yieldable in both directions of pull on the drag link, a servo-motor comprising a pressure cylinder, a piston reciprocally contained therein, and operatively connected with the ground wheels to effect their steering movements in opposite directions in accordance with movement of the piston in opposite directions from an intermediate position in the cylinder, a pressure medium circuit with a pressure relief valve interposed therein, a pump operable to forcibly deliver a fluid pressure medium through the circuit, a valve mechanism for application of pressure medium to the servo-motor comprising a four-way valve housing fixed on the drag link, and having oppositely disposed ports connected, respectively, with the opposite ends of the pressure cylinder, and with other oppositely disposed ports connected with the pressure medium circuit at opposite sides of the relief valve, a valve plug rotatably contained in the housing and movable in opposite directions to effect the application of pressure medium to the cylinder to move the piston accordingly, a second lever arm fixed to the said shaft and means providing a positive operating connection between said second lever arm and the valve plug to control the application of pressure medium to the cylinder.

(References on following page)

References Cited in the file of this patent

UNITED STATES PATENTS

| | | |
|---|---|---|
| 818,967 | Jenkins | Apr. 24, 1906 |
| 1,639,284 | Bragg | Aug. 16, 1927 |
| 1,869,698 | Komfala | Aug. 2, 1932 |
| 1,874,248 | Davis | Aug. 30, 1932 |
| 1,875,226 | Dewandre | Aug. 30, 1932 |
| 1,991,597 | Davidson | Feb. 19, 1935 |
| 2,230,361 | Morin et al. | Feb. 4, 1941 |
| 2,368,741 | Bowling | Feb. 6, 1945 |
| 2,450,126 | Fisher | Sept. 28, 1948 |